United States Patent
Roychoudhury et al.

(10) Patent No.: US 6,786,510 B2
(45) Date of Patent: Sep. 7, 2004

(54) SINGLE LOOP, FOUR-POINT SHOULDER AND LAP BELT SYSTEM

(75) Inventors: Raj S. Roychoudhury, Bloomfield Hills, MI (US); Peter C. Kempf, Dexter, MI (US); Richard W. Koning, Yale, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 162 days.

(21) Appl. No.: 10/224,082

(22) Filed: Aug. 20, 2002

(65) Prior Publication Data

US 2004/0036270 A1 Feb. 26, 2004

(51) Int. Cl.7 .............................................. B60R 22/04
(52) U.S. Cl. ...................................................... 280/802
(58) Field of Search .......................... 280/801.1, 801.2, 280/802, 803, 804; 297/468, 469, 473

(56) References Cited

U.S. PATENT DOCUMENTS 4,345,780 A * 8/1982 Moriya et al. .............. 280/802
5,443,577 A * 8/1995 Kim ............................ 280/802
6,042,190 A * 3/2000 Mathe et al. ................ 297/483
6,325,417 B1 * 12/2001 Lake .......................... 280/808

FOREIGN PATENT DOCUMENTS

JP          05139245 A  *  6/1993   ........... B60R/22/02

* cited by examiner

Primary Examiner—Paul N. Dickson
Assistant Examiner—Faye M. Fleming
(74) Attorney, Agent, or Firm—Markell Seitzman

(57) ABSTRACT

A seat belt system for securing a seated occupant to a seat, the system comprising: a single continuous length of seat belt webbing, the seat belt including first and second ends; a first anchor located near the juncture of the seat belt and seat cushion with a buckle positioned on the other side of the cushion, a movable anchor guide or second web guide for orientating portions of the seat belt relative to the seat; second means for moving the seat belt away from the seat to encourage the occupant's entry onto the seat and for thereafter manipulating the seat belt about the seated occupant so that a portion of the seat belt forms a lap belt about the seated occupant and wherein other portions of the seat belt form two relatively criss-crossed shoulder belt segments of seat belt in front of the seated occupant.

13 Claims, 6 Drawing Sheets

SINGLE LOOP, FOUR-POINT SHOULDER AND LAP BELT SYSTEM

BACKGROUND AND SUMMARY OF THE INVENTION

The present invention generally relates to seat belts and seat belt systems and more particularly to a single loop, single buckle, four-point shoulder and lap belt system.

It is an object of the present invention to provide an easy to use four-point seat belt system.

Accordingly the invention comprises: a seat belt system for securing a seated occupant to a seat, the system comprising: a single continuous length of seat belt webbing, the seat belt including first and second ends; first means for orientating portions of the seat belt relative to the seat; second means for moving the seat belt away from the seat to encourage the occupant's entry onto the seat and for thereafter manipulating the seat belt about the seated occupant so that a portion of the seat belt forms a lap belt about the seated occupant and wherein other portions of the seat belt form two relatively criss-crossed shoulder belt segments of seat belt in front of the seated occupant.

Many other objects and purposes of the invention will be clear from the following detailed description of the drawings.

DETAILED DESCRIPTION OF THE DRAWINGS

Figure 1:
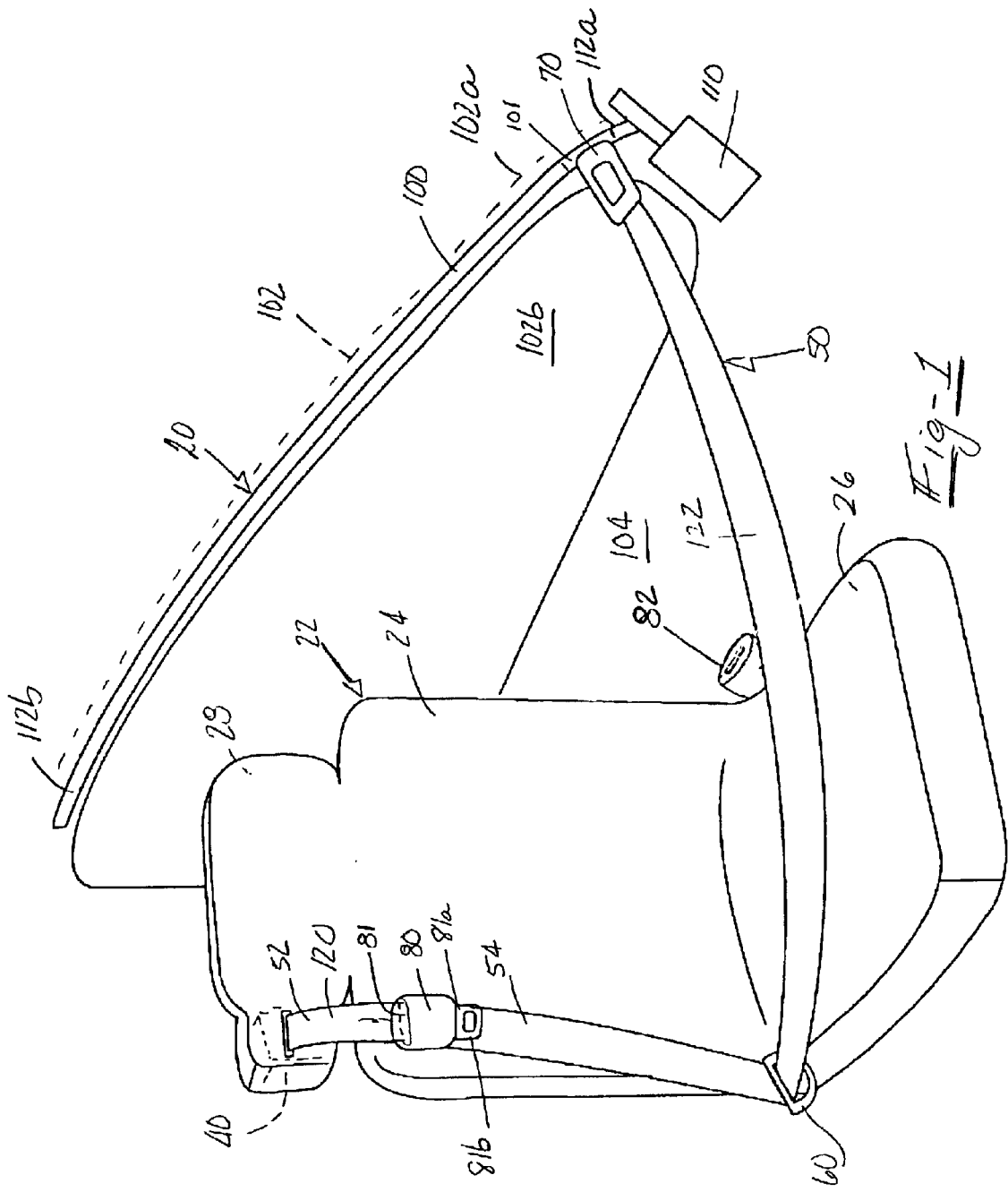
FIGS. 1–3 illustrate the various modes of operation of a first embodiment of the invention.
Figure 2:
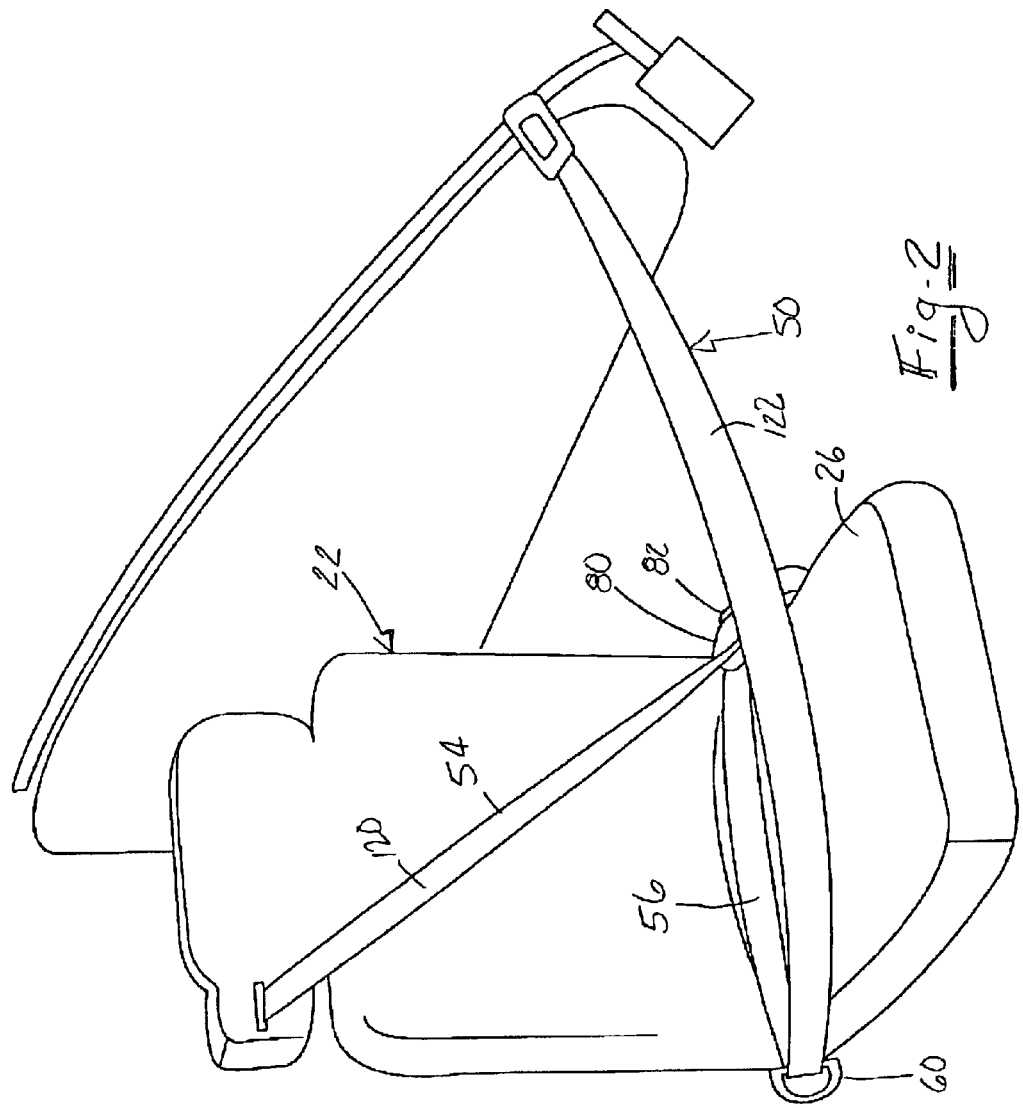
Figure 3:
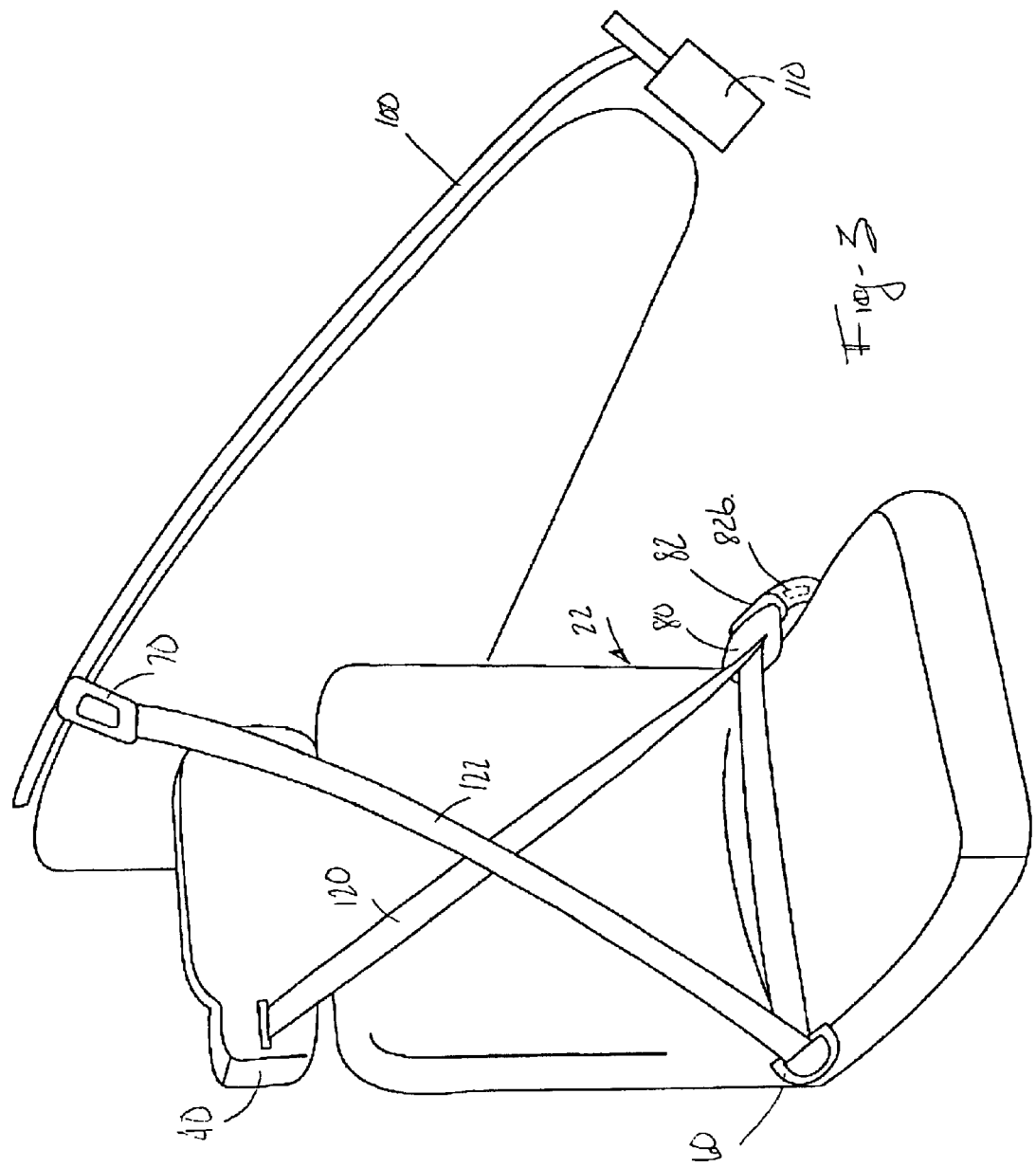
Figure 4:
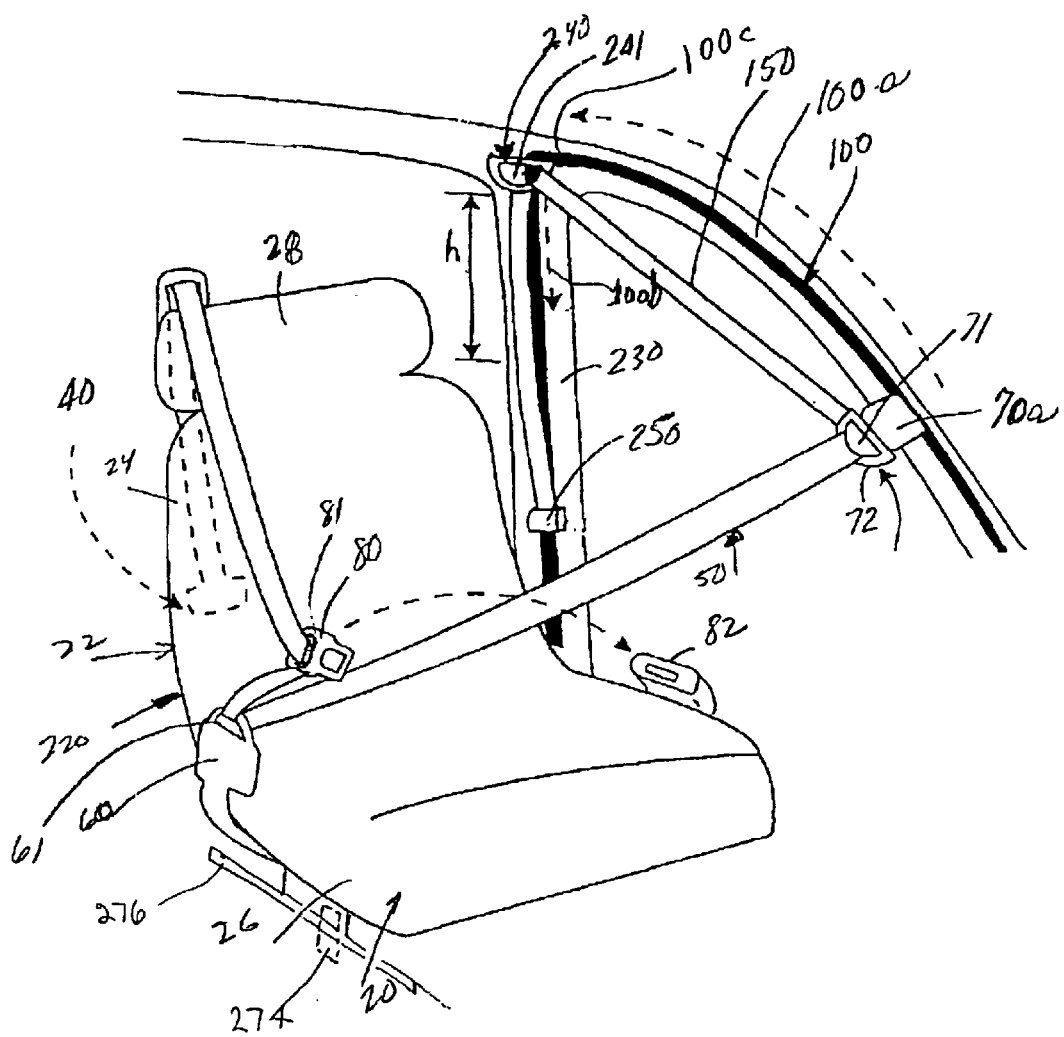
FIGS. 4 and 5 illustrate another embodiment of the system.

Reference is made to FIGS. 1–3, which diagrammatically illustrate a seat belt system 20 utilizing the present invention. FIG. 1 illustrates a seat 22 having a seat back 24, seat cushion 26 and headrest 28. A seat belt retractor 40 is integrated within the seat 22. As illustrated, the retractor is associated with the headrest 28, however, the retractor could have been situated within the seat back or even the seat cushion; the alternate configuration is shown in FIG. 4.

A seat belt 50 (also referred to as webbing or seat belt webbing) extends from the spool (not shown) of the retractor of a conventional design. As is known in the art, one end 52 of the webbing 50 is wound about this spool and the seat belt protracts and retracts relative to the retractor 40. The system includes a web guide or loop 60, having an opening or loop 61, secured to the seat frame (or to the vehicle floor) and located at the juncture of the seat back and seat cushion. The web guide 60 functions as an anchor point for the seat belt. The seat belt extends from the retractor, is threaded through the web guide 60 and extends to a movable web anchor 70, which is movable along a track 100 as discussed below.

A conventional seat belt tongue 80 is mounted to the seat belt 50 and is located between the retractor 40 and the web guide 60. The segment of seat belt between the retractor and the web guide 60 is designated as segment 54. The tongue 80 is preferably a slip tongue, which is loosely and slidably situated on the seat belt 50. For example, the slip tongue may include a slit 81 through which the belt is loosely received. The tongue also includes a latch plate 81a with a locking tip 81b, which is manually insertable within a buckle. Situated generally opposite the web guide 60 is a seat belt buckle 82. The buckle 82 can be secured to the seat frame or to the seat floor. The buckle includes an entry slit of conventional design and a locking mechanism that locks with the tongue locking tip 81b. After the occupant has sat down upon the seat 22, the occupant will take the tongue 80 and lockingly insert same in the seat belt buckle 82. The buckle 82 defines another anchor point for the seat belt system. This locked configuration is shown in FIG. 2. That portion of the webbing 50 designated by the numeral 56, which extends from the web guide 60 to the now co-joined tongue and buckle 80/82, forms a lap belt segment of the seat belt 50.

Returning to FIG. 1, the movable member or anchor 70 is slidable within or along a track or rail 100 that is situated within or near the roof rail of the vehicle and may extend through to the forward or A-pillar of the vehicle. The roof rail is generally shown by numeral 102 and the A-pillar by numeral 102a (both in phantom line). Further, by way of illustration the vehicle window and door are shown by numerals 102b and 104. Instead of locating the track in the roof rail, the track or rail can be configured in the outer periphery of the door 104 that is adjacent seat 22. U.S. Pat. Nos. 4,242,471; 4,741,555; 4,230,342 and 4,193,613 show passive motorized seat belt systems some of which show the track in the roof rail while others show the track in the door rail. Each of these patents is incorporated herein by reference.

Various seat belt buckles such as 82 include some type of electrical or electronic switch 82b (shown schematically in FIG. 3), which is useful in generating a signal indicative of the fact the tongue 80 has been locked in the buckle 82. These switches 82b can be satisfied by reed switches, Hall effect switches, optical switches, etc. The present system 20 uses this locked seat belt signal to activate motor 110, thereby causing the member 70 to move a transport mechanism 101 associated with the motor and the rail (or track) to move the member or anchor 70 from its unused or stowed position, generally at end 112a of rail 100 toward its active or used position at or near end 112b of rail 100. Any of the transport mechanisms and rails shown in the above-referenced patents can be used with the present invention.

The member or anchor 70 and its connection to the seat belt 50 can be realized in a number of ways. For example, the member or anchor 70 can include a buckle/tongue combination, which provides the user with the ability to easily disengage the belt from the track (rail) 100. U.S. Pat. Nos. 4,159,834 and 4,398,750 show examples of such anchors and are incorporated herein by reference.

The anchor or member 70 remains in its deactivated position, that is at or near end 112a of track 100. When the tongue is inserted within the buckle 82a buckle activation signal is generated and this signal is used to activate motor 110 to move the anchor 70 to its activated position. FIG. 3 illustrates the member 70 translated to its activated position at or near end 112b of track 100. Movement of the anchor 70 repositions that segment 120 of the seat belt that extends from the web guide 60 to the anchor 70, its deactivated position (shown in FIG. 2), to the active or protective position enveloping the seated occupant (which is not shown). As can be appreciated segment 120 forms one second shoulder belt (segment or portion), with segment 122 (between the retractor and the tongue 80) forming another shoulder belt (segment or portion). As can be seen in FIG. 3, the seat belt webbing 50 is positioned to define a criss-cross orientation between two shoulder belt segments 120 and 122, which define shoulder belt segments.

In this orientation, the four anchor points of the seat belt system 20 are defined by the retractor 40, the movable member or anchor 70 when it is at end 112b of the rail, the fixed web guide 60, and the combination of the tongue/buckle 80/82.

When the seat belt 50 is in the position illustrated in FIG. 3 and oriented about the occupant, the retractor 40, and in particular the rewind spring (not shown) of the retractor, will create a bias force on segment 120, causing the seat belt to slide through the tongue 80, and through the web guide 60 to tighten the webbing 50 about the seated occupant.

One of the benefits of the present invention is that an occupant need not re-learn how to use this present 4-point seat belt system 20 in comparison to conventional 3-point seat belt systems. The occupant need only secure one element of the system, such as a tongue to a single buckle and in so doing automatically forms the lap belt portion 56 of the seat belt and one of the shoulder belt portions 120. The second shoulder belt 122 is defined as the system automatically repositions the movable member 70 toward the appropriate end of the rail 100.

Figure 5:
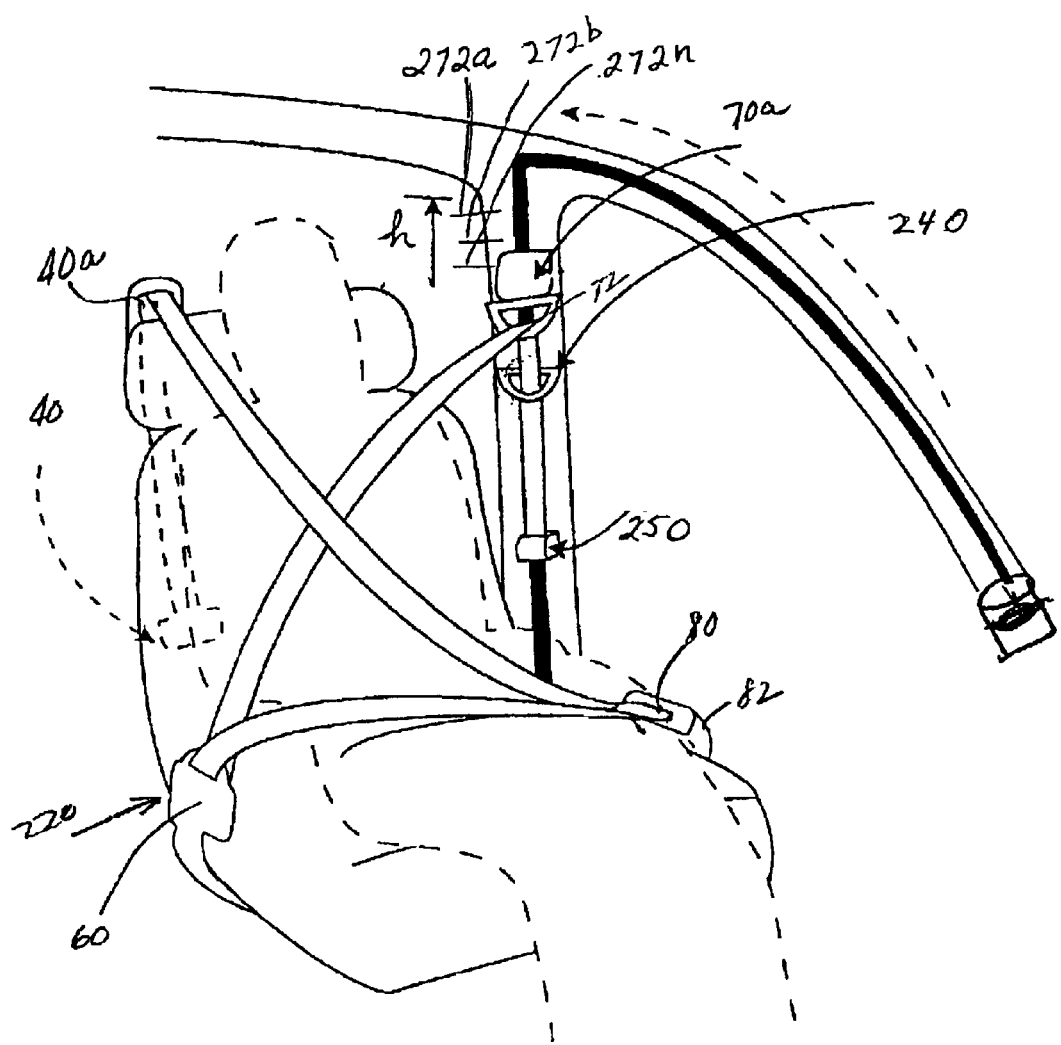

Reference is made to FIGS. 4 and 5, which illustrate an alternate seat system 220 using the present invention. System 220 also makes use of the translating anchor point, which includes member 70a translating within a rail or track 100. In this embodiment, the track 100 includes a first segment 100a located in the roof rail or in the door rail (which generally corresponds with the rail or track shown in FIGS. 1–3. Additionally, the track or rail 100 includes a downward segment 100b. This downward segment will be located in an adjacent pillar such as the B-pillar 230. If the rail is located in the door then the downward segment 230 is located in the vertical frame of the door rearward of the window. Conceptually the rail 100 includes a transitional portion 100c between sections 100a and 100b.

The translating member 70a shown in FIG. 4 differs from member 70 of FIG. 1 in that member 70a includes a web guide portion 72 having a web receiving opening 71. (With member 70, the seat belt terminated in the member 70.) In this alternate embodiment the seat belt webbing 50 is slidably received within opening 71 of the translating web guide 72. The seat belt webbing extends from the translating web guide 72 to another web guide 240, which also includes an opening 241. The webbing extends through web guide 240 and is operatively received onto a spool of another seat belt retractor 250. The rewind spring of the retractor will tend to wind the webbing on its associated spool.

Figure 6:
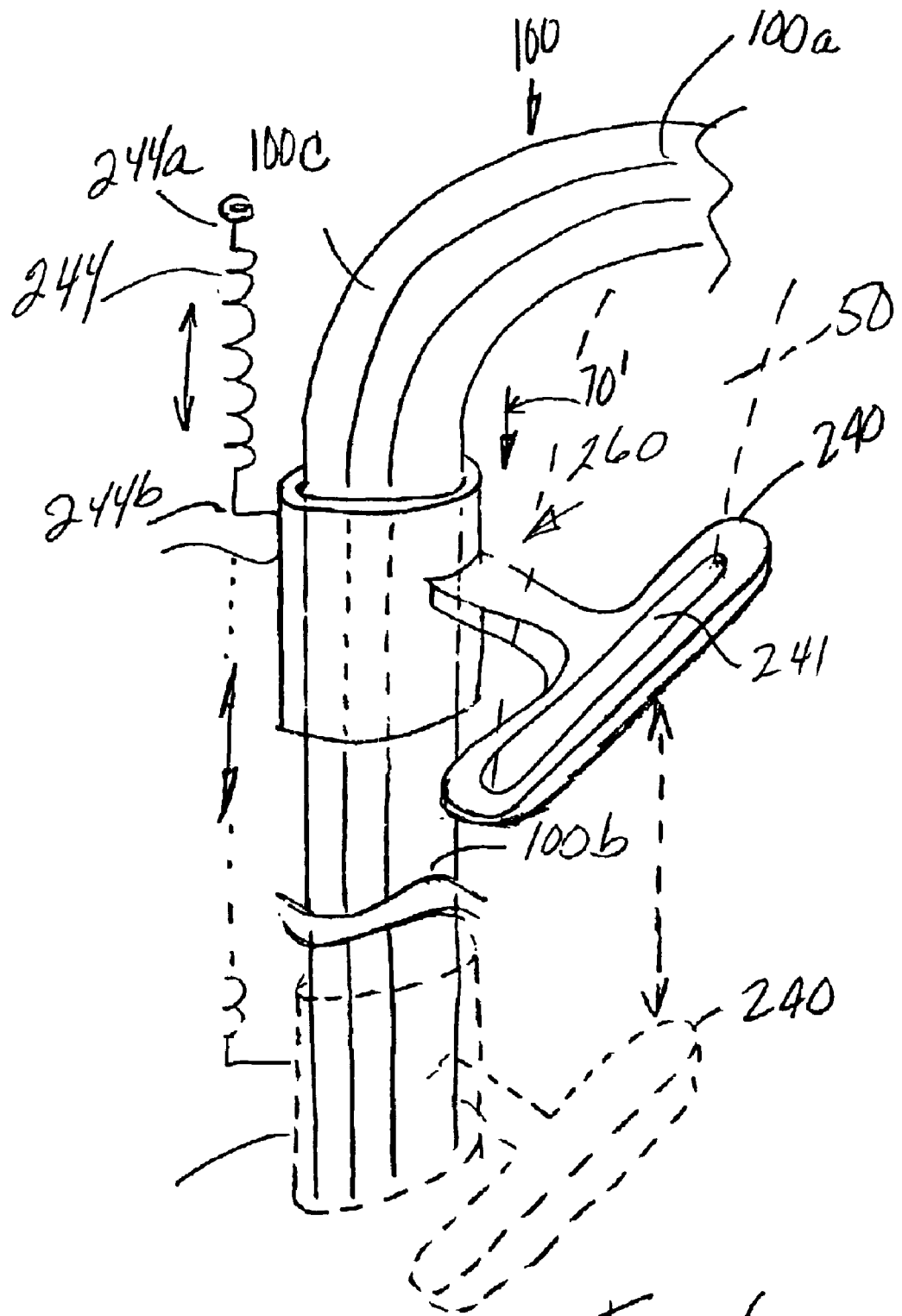
FIG. 6 shows one construction of a movable, secondary web guide in accordance with the present invention.

The seat belt web guide 240 is positioned adjacent the top of the downward segment 100b of the track 100. The web guide 240 is translatable along the rail or track segment 100a. Reference is briefly made to FIG. 6, which shows the web guide 240 in greater detail. The web guide 240 is part of an assembly 260, which includes a sleeve 242 slidingly received about the vertical portion 100b of the rail 100. A bias spring 244 upwardly biases the sleeve 242. More particularly, one end 244a of spring 244 is connected to the vehicle while another end 244b is connected to the sleeve 244. The web guide 240 extends from the sleeve 244. The seat belt 50 is shown in phantom line extending through the slot of the web guide 240. The shape of the web guide may vary with its application. For example, the web guide slot 241 in FIG. 6 is oval and in FIGS. 4 and 5 it is more arcuately shaped. The web guide can be rigidly mounted to the sleeve or can be pivoted relative to the sleeve. During the non-activated mode of operation, web guide 240 is spring loaded, by spring 244 toward the upper end of rail segment 100b. As with the earlier described embodiment of the invention in this non-active mode of operation, the member 70a is moved forwardly by motor 110 and the associated transport mechanism along the track 100 to the lower position illustrated to enhance the ease of the occupant's ingress upon the seat 20. As can be seen, however, when in an inactivated mode of operation, the position of member or anchor 70a and its associated web guide 72 and the spring-loaded web guide 240 are configured so that the segment 150 of the seat belt 50, which is generally in a crossing relation with the top of the door opening, is generally located out of the entrance path of the occupant, as the occupant either enters or exits the vehicle.

When the occupant sits upon the seat, as illustrated in FIG. 5, and manually inserts the tongue 80 into the buckle 82, the member 70a, including the web guide 72, is caused to move along the track segment 100a, through the transition portion 100c and thereafter along down segment 100b of the track. When the member 70 is moved into rail segment 100b, it forcibly pushes (see arrow 70' in FIG. 6) the spring-loaded web guide (D-ring) 240 down this rail segment 100b to the lower position also shown in FIG. 5 (in phantom line).

After the tongue 80 is inserted within the buckle 82, the motor 110 moves the member 70a and its web guide 72 into the active position whereby the web guide 72 defines one of the anchor points of system 220 as shown in FIG. 5 (although depending on the relative geometry, web guide 240 may act as the anchor point as it may be reacted on by the seat belt). Another anchor point is defined at the buckle 82 while still another is located at web guide 60. The seat belt retractor 250 is another anchor point.

As can be seen the present invention combines a translating anchor point with a 3-point seat belt system to achieve a 4-point seat belt system using a single loop of webbing. The first retractor 40 is mounted in the seat generally on the inboard side of the seat and can exit the seat at or about the shoulder height of an occupant. One end of the single length or loop of the seat belt 50 is secured to the first retractor 40 while the opposite end of the seat belt 50 is secured to the second seat belt retractor 250 (in the alternate embodiment of the invention). To provide greater flexibility to the operation of the system 220 either the first or the second retractor 40 or 250 can be an electrically controllable retractor. The benefit of using an electrically controllable retractor is that the spool can be rotated independently of a rewind spring to further eliminate any slack in the seat belt system. For example, the tension in the seat belt 50 and in particular in those segments of the seat belt directly connected to the retractors can be controlled by monitoring the electric current in the respective motors, which drive the spools of the retractors.

Reference is again made to FIGS. 4 and 5 and more particularly to the downwardly directed section 100b of the rail 100. The inclusion of this section 100b permits the present system to include a height adjuster function. As known in the art a height adjuster is a manual or automatic mechanism that permits the shoulder level web guide to be adjusted upwardly or downwardly to accommodate occupants of different sizes. Moving the web guide up and down permits the occupant to control the angle by which the seat belt (seat belt segment) exits the web guide so as to avoid the situation in which this seat belt segment uncomfortably crosses the occupant's neck. In the present invention the movable anchor 70a can be stopped at different positions or heights (h) 272a, 272b, 272n along the vertical rail segment 100b as a function of the size of the occupant. For example, the size of the occupant can be estimated by incorporating an electronic sensor 274 in or along the seat track 276. As is known the taller occupant will position the seat 22 more rearward and the shorter occupant will position the seat more forward. With knowledge of the occupant classification as determined by the seat track sensor the movable anchor 70a can be stopped at any of the positions 272a–272n. The system 20 may include a series of microswitches embedded in the B-pillar adjacent the rail segment 100b at the locations 272a–272n.

When a corresponding micro-switch is activated by interaction with the movable anchor 70a (as the movable anchor moves within the track 100b) continued movement of the moveable anchor is halted. The anchor 70a and hence the web guide 72 will be positioned at a location of the activated micro-switch, which in turn corresponds to or is correlatable with the size of the occupant. Various other occupant classification sensors including sonar or infrared based sensors can be used to determine occupant size and then accordingly adjust the location of the movable web guide to a comfortable position for that size occupant.

Many changes and modifications in the above-described embodiment of the invention can, of course, be carried out without departing from the scope thereof. Accordingly, that scope is intended to be limited only by the scope of the appended claims.

What is claimed is:

1. A seat belt system for securing a seated occupant to a seat, the system comprising: a single continuous length of a seat belt webbing configured to be movable about a seated occupant to form a 4-point restraint, the seat belt including first and second ends; first means for orientating portions of the seat belt relative to the seat; second means for moving the seat belt away from the seat for allowing an occupant's entry onto the seat and for thereafter manipulating the seat belt about a seated occupant position so that a portion of the seat belt forms a lap belt and wherein other portions of the seat belt form two relatively criss-crossed segments of the seat belt in front of the seated occupant position.

2. The system as defined in claim 1 wherein the first means includes:

a first retractor;

a first web guide operatively mounted relative to an inboard side of the seat, the first end of the seat belt being operatively connected to and retractable upon the first retractor; the seat belt extending from the first retractor and extending through the first web guide, and a tongue, adapted to lockingly engage with a seat belt buckle mounted relative to the seat generally opposite the first web guide.

3. The system as defined in claim 2 including a seat belt buckle positioned relative to the seat and mounted oppositely relative to the first web guide, wherein with the tongue is locked within the buckle, that portion of the seat belt extending from the first web guide to the locked tongue defines a lap belt and wherein that portion of the seat belt between the first retractor and the lock tongue defines a first shoulder belt.

4. The system as defined in claim 1 wherein the second means includes a movable anchor movable between an active and a stowed position, wherein when in the active position the seat belt extends between the first web guide to the movable anchor forming a shoulder belt segment of the seat belt.

5. The system as defined in claim 4 wherein the movable anchor includes a second web guide, wherein the seat belt is slidable through to the second web.

6. The system as defined in claim 4 wherein the seat belt is non-slidingly secured to the movable anchor.

7. The system as defined in claim 4 wherein the movable anchor is movable about a rail or track located in the region of the top of a door of a vehicle.

8. The system as defined in claim 7 wherein the rail includes a downwardly directed rail portion through which the movable anchor is movable.

9. The system as defined in claim 8 wherein the system further includes a secondary web guide (240) located near a top of the second rail portion.

10. The system as defined in claim 8 wherein the secondary web guide is spring loaded and biased by a spring toward the top of the second rail section.

11. The system as defined in claim 10 wherein the movable anchor is configured to contact and move to the secondary web guide to a downward position.

12. The system as defined in claim 2 wherein the system includes a second retractor located to receive the seat belt which extends from the movable anchor and secondary web guide.

13. The system as defined in claim 1 further including comfort means for moving a web guide associated with one of the criss-crossed segments to a comfortable position corresponding with the size of an occupant.

* * * * *